United States Patent
Syrdal et al.

(10) Patent No.: US 9,218,815 B2
(45) Date of Patent: *Dec. 22, 2015

(54) SYSTEM AND METHOD FOR DYNAMIC FACIAL FEATURES FOR SPEAKER RECOGNITION

(71) Applicant: AT&T Intellectual Property I, L.P., Atlanta, GA (US)

(72) Inventors: Ann K. Syrdal, Morristown, NJ (US); Sumit Chopra, Jersey City, NJ (US); Patrick Haffner, Atlantic Highlands, NJ (US); Taniya Mishra, New York, NY (US); Ilija Zeljkovic, Scotch Plains, NJ (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/551,907

(22) Filed: Nov. 24, 2014

(65) Prior Publication Data

US 2015/0081302 A1     Mar. 19, 2015

Related U.S. Application Data

(63) Continuation of application No. 13/101,704, filed on May 5, 2011, now Pat. No. 8,897,500.

(51) Int. Cl.
G06K 9/00     (2006.01)
G10L 17/24    (2013.01)
G06F 21/32    (2013.01)

(52) U.S. Cl.
CPC ............. *G10L 17/24* (2013.01); *G06F 21/32* (2013.01)

(58) Field of Classification Search
None
See application file for complete search history.

(56) References Cited

U.S. PATENT DOCUMENTS

| | | |
|---|---|---|
| 6,219,640 B1 | 4/2001 | Basu et al. |
| 6,490,560 B1 | 12/2002 | Ramaswamy et al. |
| 6,691,089 B1 | 2/2004 | Su et al. |
| 6,931,375 B1 | 8/2005 | Bossemeyer, Jr. et al. |
| 7,106,845 B1 | 9/2006 | Zhuk et al. |
| 7,231,350 B2 | 6/2007 | Gable et al. |

OTHER PUBLICATIONS

Hazen et ak., "Multi-Modal Face and Speaker Identification for Mobile Devices", Preprint of Chapter 9 of book *Face Biometrics for Personal Identification: Multi-Sensory Multi-Modal Systems*, edited by R. I. Hammoud, B. R., Abidi and M. A. Abidi., Springer, Berlin 2007.

*Primary Examiner* — Vikkram Bali

(57) ABSTRACT

Disclosed herein are systems, methods, and non-transitory computer-readable storage media for performing speaker verification. A system configured to practice the method receives a request to verify a speaker, generates a text challenge that is unique to the request, and, in response to the request, prompts the speaker to utter the text challenge. Then the system records a dynamic image feature of the speaker as the speaker utters the text challenge, and performs speaker verification based on the dynamic image feature and the text challenge. Recording the dynamic image feature of the speaker can include recording video of the speaker while speaking the text challenge. The dynamic feature can include a movement pattern of head, lips, mouth, eyes, and/or eyebrows of the speaker. The dynamic image feature can relate to phonetic content of the speaker speaking the challenge, speech prosody, and the speaker's facial expression responding to content of the challenge.

20 Claims, 8 Drawing Sheets

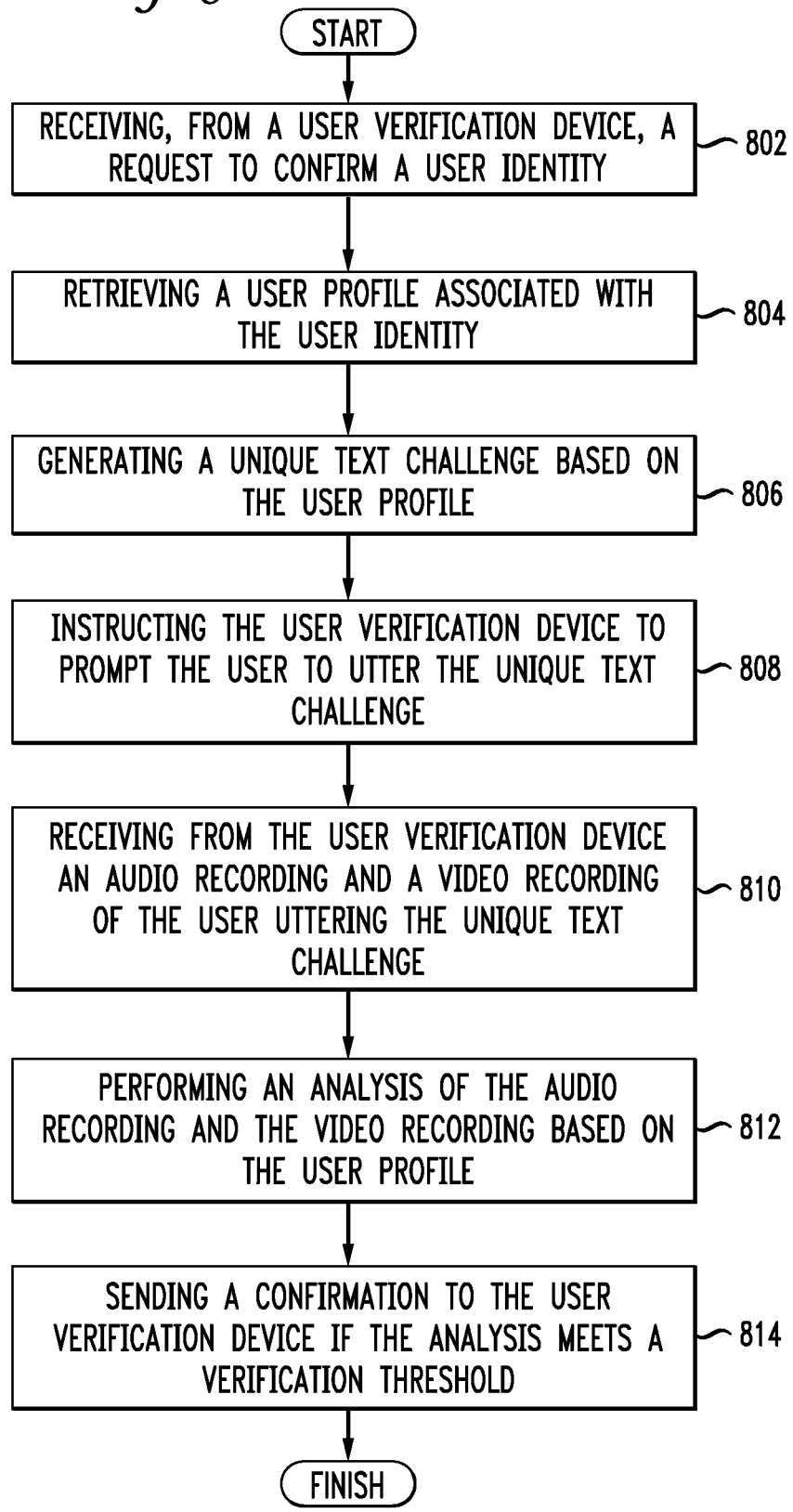

SYSTEM AND METHOD FOR DYNAMIC FACIAL FEATURES FOR SPEAKER RECOGNITION

PRIORITY INFORMATION

The present application is a continuation of U.S. patent application Ser. No. 13/101,704, filed May 5, 2011, the content of which is incorporated herein by reference in its entirety.

BACKGROUND

1. Technical Field

The present disclosure relates to speaker verification or recognition and more specifically to confirming an identity of a particular speaker based on dynamic facial features of a user while the user is speaking.

2. Introduction

Speaker verification or recognition is the process of identifying a particular speaker, and not necessarily what that speaker is saying. Speaker verification can provide benefits in many applications, contexts, and devices. For example, a smartphone can incorporate speaker verification to ensure that only authorized users can access local and/or network resources through the smartphone. Speaker verification can be beneficial for users that have difficulty using traditional computing input devices such as a keyboard or mouse or for users that prefer using speaker verification systems. However, existing speaker verification approaches rely on acoustic characteristics of the voice of a speaker. Each speaker's voice has unique characteristics which can provide a certain level of biometric identification Such as pitch, tone, and amplitude. However, a noisy background, a bad connection, or other difficult speaking conditions, for example, can make detection of these unique characteristics difficult. These shortcomings can lead to user frustration if the system is unable to verify the identity of a known user. These shortcomings can also lead to security risks if the system misrecognizes the identity of a user.

Further, attackers can deceive many existing speaker verification systems with relative ease. For example, an attacker can pose as a particular speaker by playing back a sufficiently high quality voice recording of that speaker. In the face of these difficulties, whether due to unintentional factors or due to intentional human fraud, the robustness of speaker verification systems can degrade. Existing speaker verification approaches provide a useful authentication technology, but lack a described level of robustness.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for performing speaker verification. A system configured to practice the method receives a request to verify a speaker and generates a text challenge that is unique to the request. In response to the request, the system prompts the speaker to utter the text challenge and records a dynamic image feature of the speaker as the user utters the text challenge. The system can generate the text challenge to elicit one or more highly distinctive behaviors of the speaker. The dynamic image feature can include a pattern of movement of any body part, such as head, lips, mouth, eyes, and eyebrows. The pattern of movement can be based on any observable body part, such as a shoulder shrug, hand gesture, nod, wink, twitch, and so forth. The dynamic image feature can relate to phonetic content of the speaker speaking the text challenge, speech prosody, and/or a facial expression of the speaker in response to content of the text challenge. Then the system can perform speaker verification of the user based on the dynamic image feature and the text challenge. For example, the system can perform speaker verification based on a database of speaker behaviors, a speaker profile, and/or a location of the speaker.

Also disclosed herein are systems, methods, and non-transitory computer-readable storage media for identifying a user. A system configured to practice this method prompts the user to utter a unique text challenge and records audio and video of the user while the user utters the unique text challenge. If the unique text challenge is unpredictable or unguessable, then the system can provide enhanced security and certainty that the user is not an imposter. Then the system performs a comparison of the audio and the video to a database of observable behavior based on the unique text challenge and identifies the user based on the comparison. The system can further ensure that the audio and the video match. For example, the system can identify features of the user in the video, analyze the features, and temporally align the features to the audio based on the unique text challenge. The features can include a degree of a mouth opening, symmetry of the mouth opening, lip rounding, lip spreading, visible tongue position, head movement, eyebrow movement, eye shape, and/or a facial expression of the user in response to the unique text challenge.

Further disclosed herein are systems, methods, and non-transitory computer-readable storage media for serving requests for speaker verification as a service. A system configured to practice this method receives, from a user verification device, a request to confirm a user identity and retrieves a user profile associated with the user identity. Then the system generates a unique text challenge based on the user profile and instructs the user verification device to prompt the user to utter the unique text challenge. The system receives from the user verification device an audio recording and a video recording of the user uttering the unique text challenge and performs an analysis of the audio recording and the video recording based on the user profile. Then the system can send a confirmation to the user verification device if the analysis meets a verification threshold. In one variation, the system also receives from the user verification device an indication of desired user verification certainty, and sets the verification threshold based on the desired user verification certainty. The user verification device can use the confirmation as part of a multi-factor authentication of the user.

The user profile can be generated as part of a user enrollment process. For example, the user can voluntarily and actively enroll in the speaker verification system by providing speech samples so that the system can generate the user profile and determine which types of text challenges elicit which types of visual or observable features while the user speaks the text challenge. Using the user profile, the system can generate unique text challenges designed to elicit a distinctive identifiable behavior in the user as the user utters the unique text challenge.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 8 illustrates a third example method embodiment confirming an identity of a user through a user verification device.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for more effective speaker verification or identification. A brief introductory description of a basic general purpose system or computing device in FIG. 1 which can be employed to practice the concepts is disclosed herein, followed by a discussion of a natural spoken language dialog system. A more detailed description of speaker verification and the various approaches will then follow. The disclosure now turns to FIG. 1.

Figure 1:
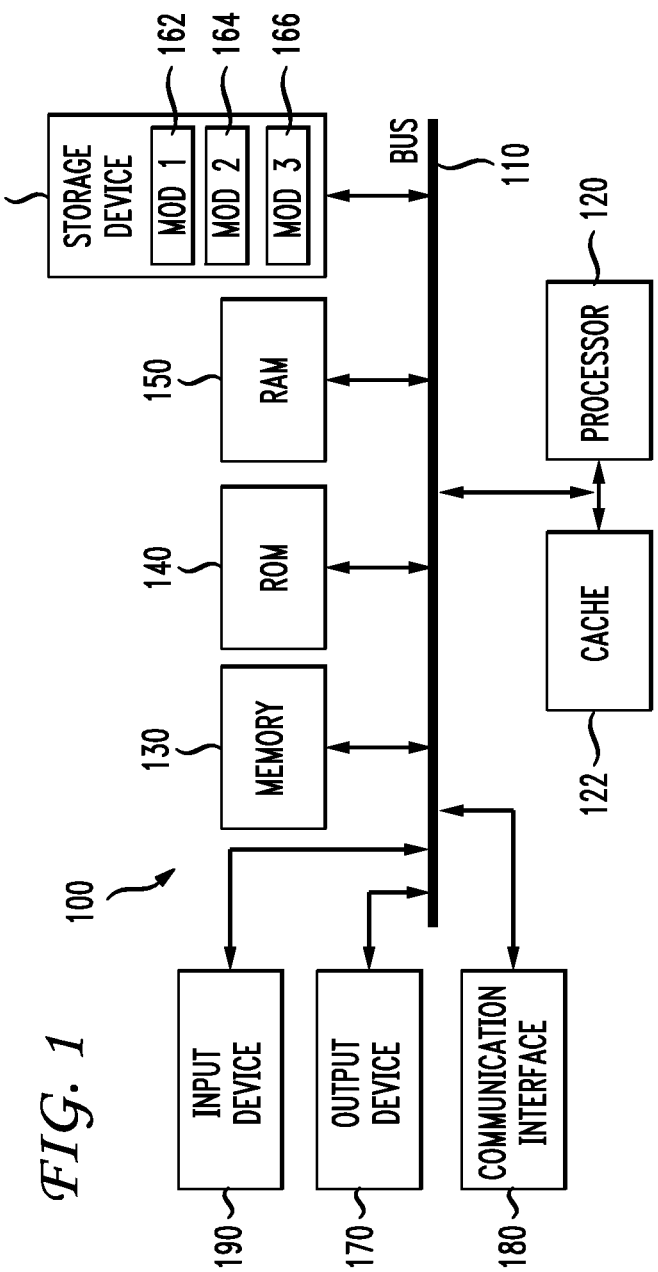
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
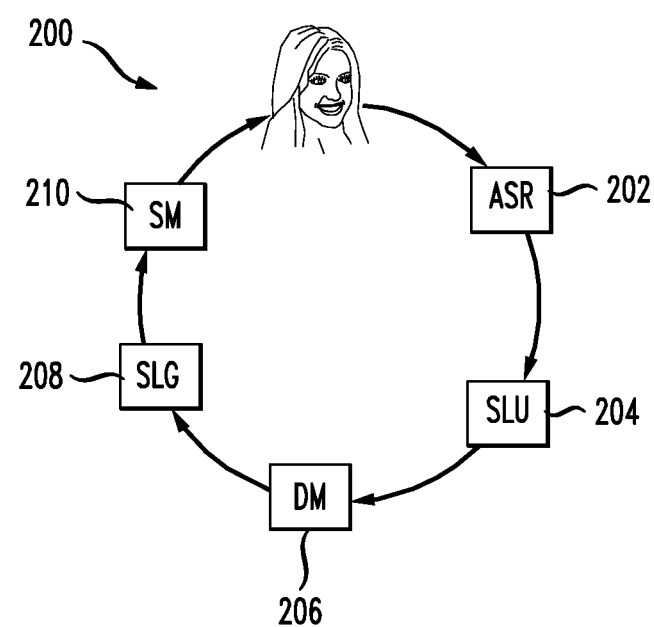
FIG. 2 illustrates a functional block diagram of an exemplary natural language spoken dialog system.

Having disclosed some components of a computing system, the disclosure now turns to FIG. 2, which illustrates a functional block diagram of an exemplary natural language spoken dialog system. Spoken dialog systems aim to identify intents of humans, expressed in natural language, and take actions accordingly to satisfy the human requests. Natural language spoken dialog system 200 can include an automatic speech recognition (ASR) module 202, a spoken language understanding (SLU) module 204, a dialog management (DM) module 206, a spoken language generation (SLG) module 208, and synthesizing module 210. The synthesizing module can be any type of speech output module. For example, it can be a module wherein one prerecorded speech segment is selected and played to a user. Thus, the synthesizing module can represent any type of artificial speech output. The present disclosure can be incorporated as part of the ASR module 202 and can be included as part of other components of the dialog system as well.

The ASR module 202 analyzes speech input and provides a textual transcription of the speech input as output. SLU module 204 can receive the transcribed input and can use a natural language understanding model to analyze the group of words that are included in the transcribed input to derive a meaning from the input. The role of the DM module 206 is to interact in a natural way and help the user to achieve the task that the system is designed to support. The DM module 206 receives the meaning of the speech input from the SLU module 204 and determines an action, such as, for example, providing a response, based on the input. The SLG module 208 generates a transcription of one or more words in response to the action provided by the DM 206. The synthesizing module 210 receives the transcription as input and provides generated audible speech as output based on the transcribed speech.

Thus, the modules of system 200 recognize speech input, such as speech utterances, transcribe the speech input, identify (or understand) the meaning of the transcribed speech, determine an appropriate response to the speech input, generate text of the appropriate response and from that text, generate audible "speech" from system 200, which the user then hears. In this manner, the user can carry on a natural language dialog with system 200. Those of ordinary skill in the art will understand the programming languages for generating and training ASR module 202 or any of the other modules in the spoken dialog system. Further, the modules of system 200 can operate independent of a full dialog system. For example, a computing device such as a smartphone (or any processing device having a phone capability) can include an ASR module wherein a user says "call mom" and the smartphone acts on the instruction without a "spoken dialog." A module for performing speaker verification can join the system at any point or at multiple points in the cycle or can be integrated with any of the modules shown in FIG. 2.

Having disclosed some components of a computing system and a natural language spoken dialog system, the disclosure returns now to a discussion of speaker verification. The speaker verification approach disclosed herein provides several benefits. For example, head movements and facial expressions are a noisy data source, meaning that users usually exhibit at least some of these behaviors, but it is difficult to correlate these behaviors precisely with what is being spoken. As another example, speaker recognition or verification systems that rely exclusively on an acoustic speech signal degrade quickly in noisy environments.

Speaker verification can be based on audio and/or on an image of a user. However a dynamic image or video data can provide more information upon which to identify an individual, particularly if the individual is speaking. Patterns of movement vary widely from speaker to speaker, such as movement, acceleration, position, and orientation of the head, shoulders, ears, nose, cheeks, lips, mouth, eyes, eyebrows, and other facial features. These movements, accelerations, positions, and orientations can all serve as biometric measures to identify a particular user. These biometric measures can add more dimensions for robustly recognizing an identity or verifying a speaker. A non-facial response can also be encoded as part of a user's identity for recognition of that user. This disclosure describes a speaker verification or speaker recognition system in which the speaker reads aloud an unpredictable passage of text. The system captures, analyzes, and/or temporally aligns captured features of the speaker's dynamic image or video data to the speaker's recorded speech. The dynamic image features can relate to the phonetic content of speech, speech prosody, and/or facial expressions in response to the content of the passage. The system can control (or generate) passages of text that are designed or intended to elicit highly distinctive behavior on an individual basis. Then the system can exploit the highly distinctive behavior to verify or recognize a user identity. This approach can be used for speaker verification alone, as part of another authentication approach, and/or in conjunction with other compatible user identification approaches such as password verification or other biometric authentication schemes.

An exemplary speaker verification or speaker recognition system prompts a speaker to read aloud an unpredictable passage of text presented, and records or receives features of the speaker's dynamic image, analyzes those features, and temporally aligns the features to the speaker's corresponding speech. The system can achieve high recognition accuracy because the system already knows the intended spoken message. Further, the system can achieve high accuracy alignment of the speech and features. The dynamic image features can include features that relate to the phonetic content of speech, such as degree and symmetry of mouth opening, lip rounding or spreading, or visible tongue position. The dynamic image features can also include features that relate to speech prosody, such as head or eyebrow movements and changes in eye shape that tend to occur during emphasized words or at the ends of phrases. The system can analyze facial expressions of the speaker in response to the content. Facial expressions provide yet another dynamic pattern to distinguish among or identify individuals. The system can control or select which passage the user speaks. In this way, the system has the flexibility to select material that elicits the most highly distinctive behavior, or material that is expected to elicit highly distinctive behavior, for each individual user. Incorporation of dynamic image features improves system robustness, especially in noisy environments where the acoustic speech signal quality may be degraded, or in dark environments where still images are low quality.

In some example implementations, the system does not rely explicitly on representations of a person's facial features. For example, the system can analyze any image feature set represented as pixel-based gradients across an image that may not even correlate to physical objects, much less faces. However, patterns of these gradients, aggregated over space (regions of the image) and time (multiple frames from the video), can provide adequate speaker representations.

The system disclosed herein can elicit and record a range of observable behaviors that provides multiple features usable for speaker verification or recognition. The system can temporally correlate, or align, speech output and multi-dimensional head and facial movements and expressions. The combination of multi-dimensional movements, the dynamic aspect of the user behavior elicited, and the unpredictability of the text passage greatly reduces the chances of an attacker defeating the system through technological means.

Figure 3:
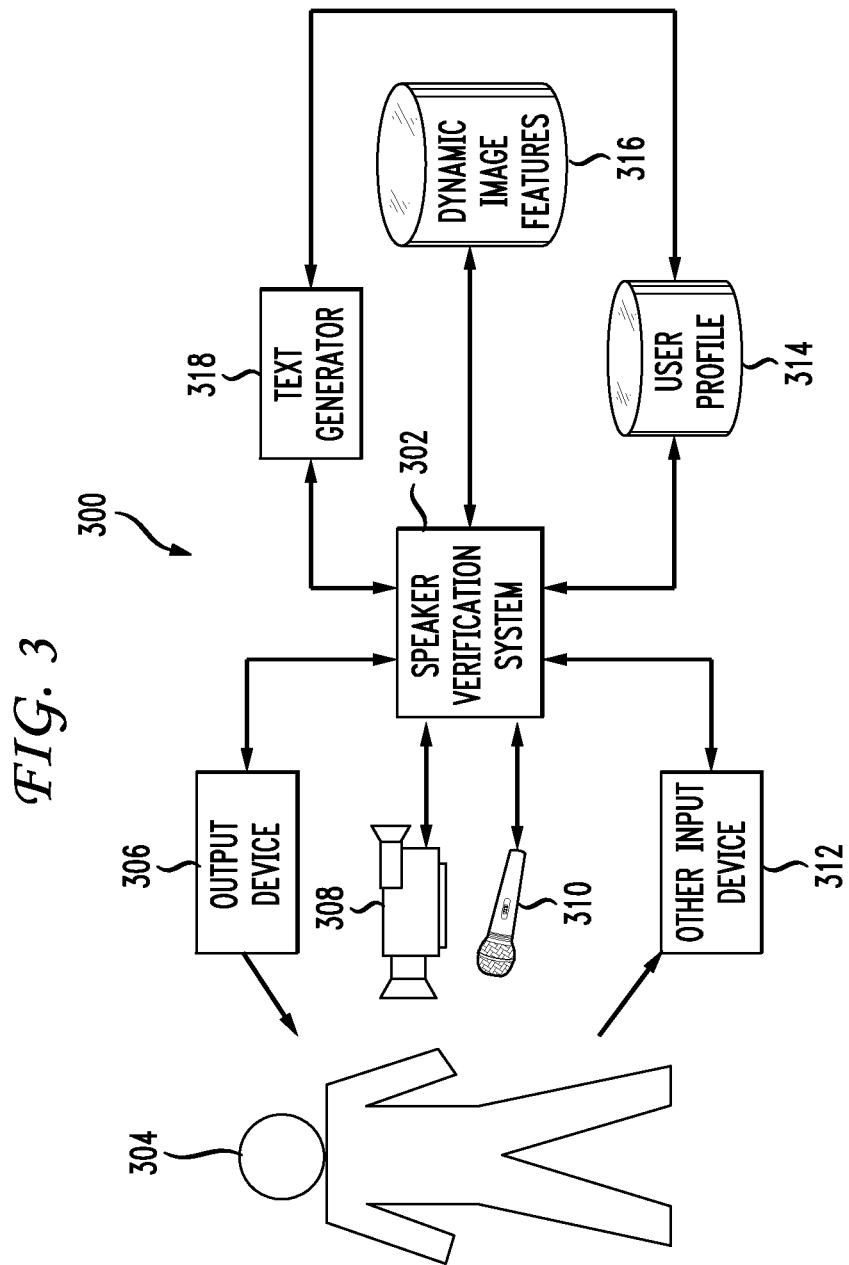
FIG. 3 illustrates a first exemplary architecture for performing speaker verification.

The disclosure turns now to a discussion of several exemplary architectures for implementing speaker verification. FIG. 3 illustrates a first exemplary architecture 300 for performing speaker verification. In this architecture 300, a speaker verification system 302 intends to verify the identity of a speaker 304, such as through an input device 312 including a keyboard, mouse, touch screen, voice command processor, and so forth. The speaker verification system 302 can optionally retrieve some indication of an asserted identity of the speaker 304 and retrieve a corresponding user profile 314. Based on the user profile 314, the speaker verification system 302 can retrieve a text passage from a text generator 318 and prompt the speaker 304, via an output device 306, to utter the text passage.

The text generator 318 can determine which words to include in the text passage, a length of the text passage, and other characteristics of the text passage, based on a desired level of security or certainty of the speaker verification. For example in a high security situation, the text generator 318 can generate a longer text passage and/or include multiple portions intended to elicit or trigger a respective particular facial movement, expression, or other observable behavior as the user speaks the text passage, whereas the text generator can generate a simpler or shorter text passage in lower security situations. The text generator can optionally generate text in languages other than English. For example, a user profile can indicate languages spoken by a particular user. Based on that user profile, the text generator can choose a language in which to generate the text passage. In a higher security situation, the text generator can choose a language that is more uncommon, or that elicits a more identifiable facial movement, expression, or other observable behaviors.

The speaker verification system 302 records the speaker 304 while the speaker 304 utters the text passage, such as with a microphone 310 and/or a video camera 308. The speaker verification system 302 can compare features of the speaker 304 to a database of dynamic image features 316. The system can determine the identity of the speaker 304 based on a similarity threshold between a combination of detected features of the speaker 304 and a combination of known or expected features associated with a particular identity. The system can raise or lower the similarity threshold in different situations. The speaker verification system 302 can then use the determined identity of the speaker 304, optionally with results of other aspects of a multi-factor authentication scheme (such as an analysis of acoustic characteristics of the speaker's voice or a combination of a username and password), to provide access to services, files, information, and/or other additional resources.

Figure 4:
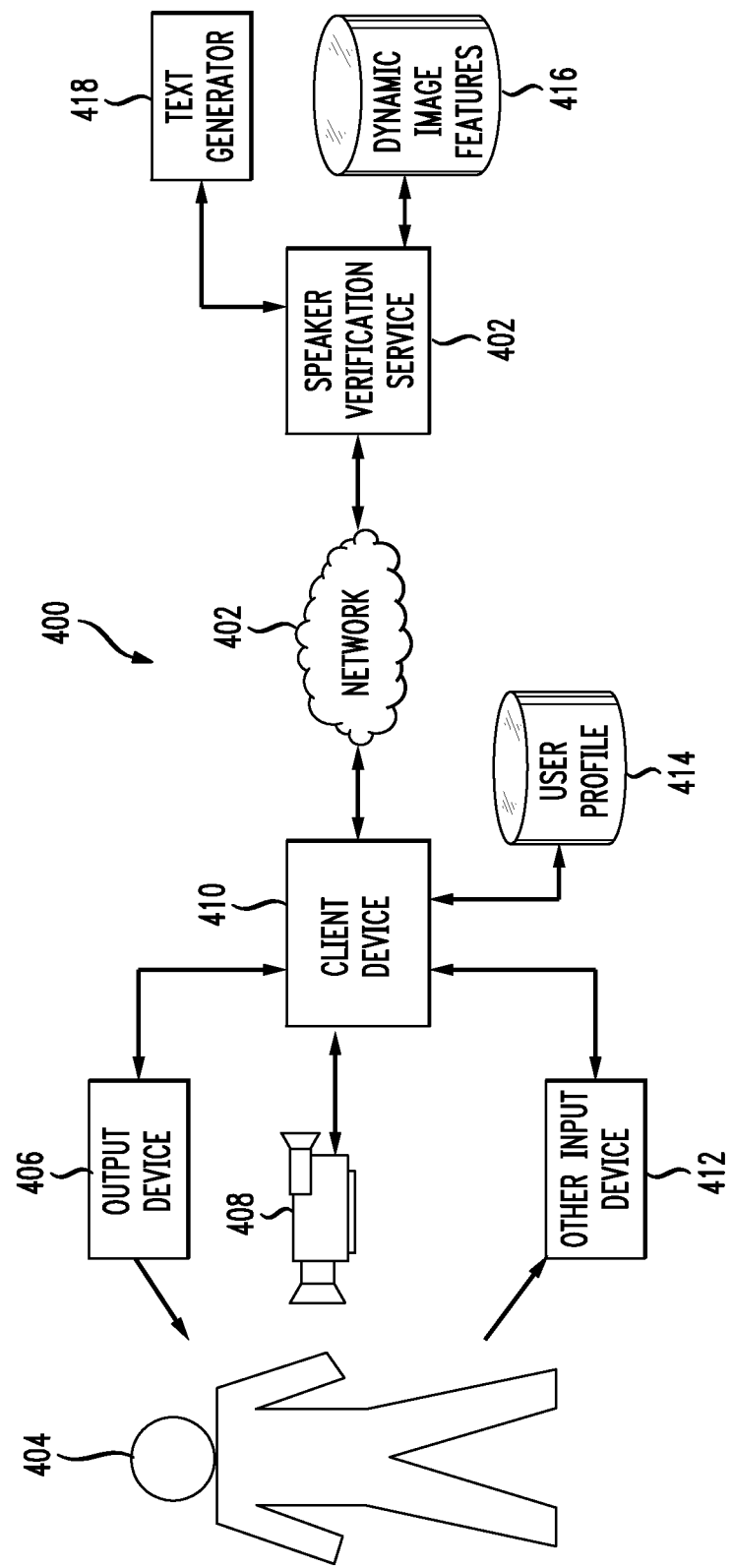
FIG. 4 illustrates a second exemplary network-based architecture for providing speaker verification as a service.

FIG. 4 illustrates a second exemplary network-based architecture 400 for providing speaker verification as a service. In this example, a client device 410 accesses the speaker verification service 402 via a network 420. The client device 410 may have no control over how the speaker verification occurs, and the speaker verification service 402 may have no control over how the speaker's speech is gathered. In one example of this arrangement, the client device 410 is a smartphone, the network 420 is a combination of the cellular telephone network and the Internet, and the speaker verification service 402 is a collection of servers that provide speaker verification as a web site or via an application programming interface (API).

The client device 410 determines a need for verifying the identity of the speaker 404. The client device 410 communicates that need to the speaker verification service 402 via the network 420. The client device 410 optionally retrieves information from a user profile 414 and sends that information to the speaker verification service 402. The speaker verification service 402 retrieves or generates a text challenge, optionally based on the user profile information, via a text generator 418, designed to elicit highly distinctive behavior from the speaker 404 as the speaker 404 speaks the text challenge. The speaker verification service 402 then transmits the text challenge to the client device 410 via the network 420. The client device 410 prompts the speaker 404, via an output device 406 such as a visual prompt on a display or an audible output, to say the text challenge. The client device 410 captures information about the speaker 404 as the speaker says the text challenge, such as a series of still images via a camera 408 or video data via a camera 408. The client device 410 can capture other inputs via other input devices 412, such as a microphone, accelerometer, or other sensor. The client device 410 can optionally align the various inputs and transmit the inputs to the speaker verification service 402. For example, the client device 410 can align audio and video recordings such that they are temporally synchronized. Further, inasmuch as the system knows what the spoken text is supposed to be (based on the text challenge), the system can more easily align the audio with the video. If the client device 410 does not align the inputs, then the speaker verification service 402 can align the inputs. The speaker verification service 402 can then compare the inputs, i.e. the video and audio of the speaker 404 saying the text challenge, to a database of dynamic image features 416. The speaker verification service 402 can select specific dynamic image features from the database 416 based on user profile 414 information. If the speaker verification service 402 determines that the inputs are a sufficiently close match to the dynamic image features based on a similarity threshold, then the speaker verification service 402 confirms the identity to the client device 410 through the network 420. The speaker verification service 402 can optionally provide a certainty score of the identification accuracy to the client device 410.

In one variation, the client device 410 computes image and audio features based on a local database of dynamic image features and transmits that information via the network 402 to the speaker verification service 402. However, the arrangement shown in FIG. 4 can provide additional security over this variation, as well as reduced computing, power, and/or storage requirements on the client device 410. In yet another variation, the client device 410 transmits the information to an entirely separate third party, such as a specialized processor optimized for such calculations, which then compares the inputs to the database of dynamic image features and, in turn, transmits results to the speaker verification service 402.

The certainty score of the identification accuracy can be based on a number of different sources. For example, the certainty score can be based on a matching threshold to the dynamic image features. Very close matches provide a higher certainty score, and less close matches provide lower certainty scores. Another example is image or video quality. If the camera is low-resolution, captures at 8-bit color depth, or only captures 12 frames per second, the resulting certainty score may be lower than the score from a high definition camera that captures at 60 frames per second or 24-bit color depth. Similarly, the image quality of the captured video can affect the certainty score. If the captured video is grainy, dimly lit, and low contrast, the resulting certainty score can be lower than the score of video captured in a bright area with sharp details.

Once the client device 410 receives the confirmed identity, the client device 410 can allow the speaker 404 to access additional resources or decide whether to impose additional authentication requirements on the speaker 404. For example, if the certainty score from the speaker verification service 402 indicates a 90% or greater certainty, then the client device 410 can forego any additional authentication mechanisms. If the speaker verification service 402 indicates a certainty 70% up to 90% certainty, then the client device 410 can require the user to enter a PIN as an additional authentication or identification mechanism. If the speaker verification service 402 indicates less than a 70% certainty, then the client device 410 can require the user to enter a username and a password. In this way, the speaker verification service can verify the speaker identity with greater certainty and/or accuracy.

Figure 5:
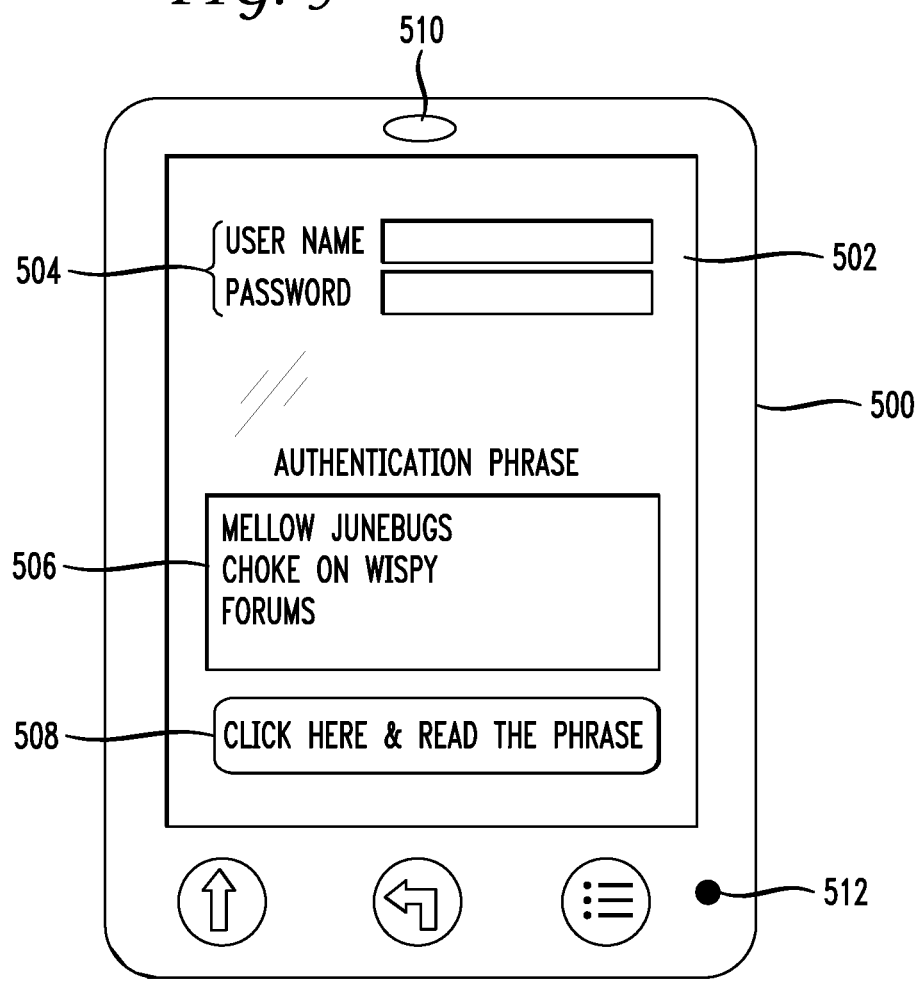
FIG. 5 illustrates an example user interface for performing speaker verification.

FIG. 5 illustrates an example user interface 502 for performing speaker verification on a mobile device 500, such as the client device 410 of FIG. 4. In this example user interface 502, the device 500 prompts the user to enter a username and password 504 to establish an initial identity. Then the device 500 presents an authentication phrase 506, based on retrieved user profile information based on the initial identity, and a "click here" button 508. The exemplary authentication phrase is "Mellow Junebugs Choke on Wispy Forums". The authentication phrase can be a set of words that are not semantically connected, a semantically correct but meaningless sentence, a semantically correct and meaningful sentence, or any other collection of words, numbers, symbols, pictographs, emoticons, and/or images. In any of these situations, the system can select or generate parts of the authentication phrase to include words or phrases that invoke positive or negative emotions in the speaker to elicit a particular emotional or other response and the corresponding dynamic image features. The authentication phrase can include punctuation as well as additional formatting, such as highlight, bold, italic, and underlined words which can influence how the speaker 512. When the user clicks the button 508 and begins to say the authentication phrase 506, the device 500 records the audio via a speaker 512 and records the video via a camera 510. The speaker 512 and the camera 510 can be integrated as part of the device, as shown, or can be separate external components. Then the device 500 can perform speaker verification as set forth above.

Figure 6:
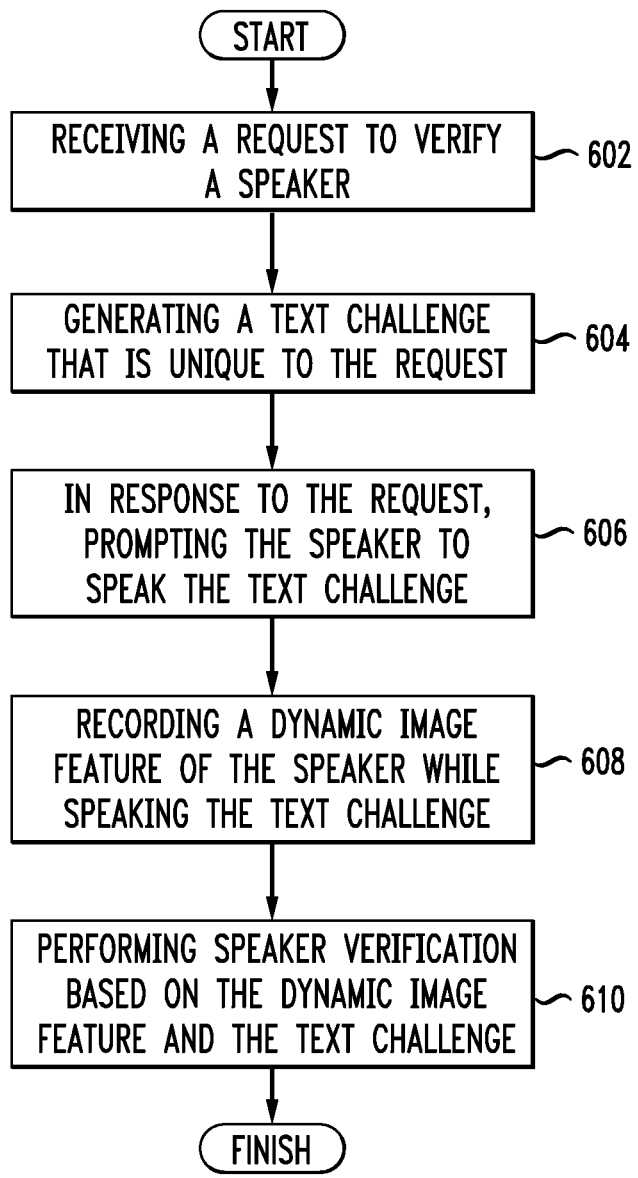
FIG. 6 illustrates a first example method embodiment for performing speaker verification.
Figure 7:
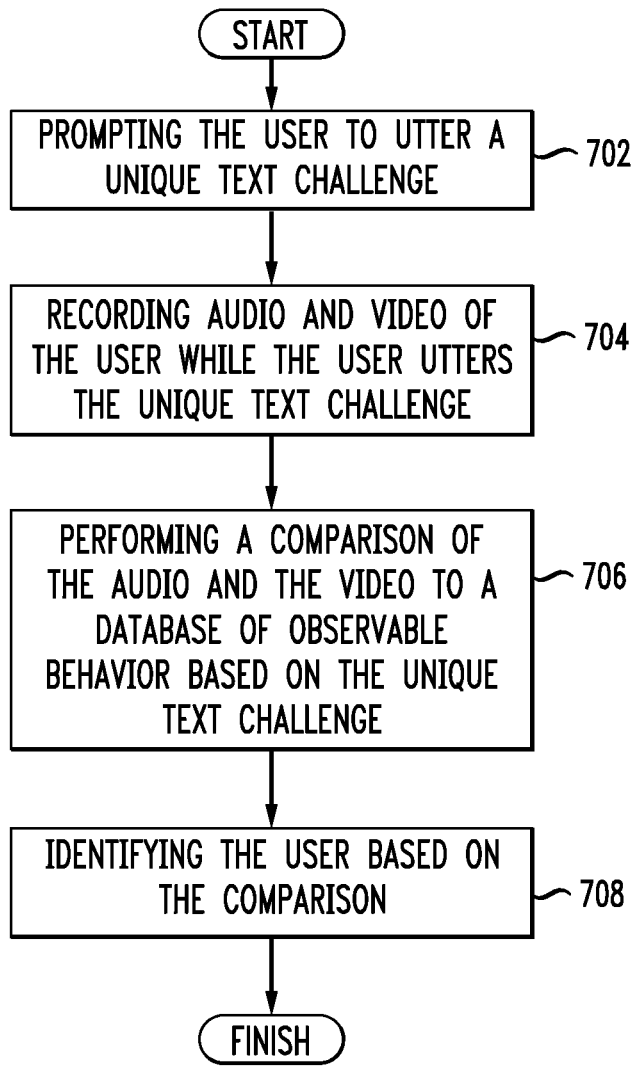
FIG. 7 illustrates a second example method embodiment for identifying a user.

Having disclosed some basic system components and concepts, the disclosure now turns to the exemplary method embodiments shown in FIGS. 6-8. For the sake of clarity, each of the methods is discussed in terms of an exemplary system 100 as shown in FIG. 1 configured to practice the respective method. The steps outlined herein in each of the methods are exemplary and can be implemented in any combination thereof, including combinations that exclude, add, or modify one or more steps.

FIG. 6 illustrates a first example method embodiment for performing speaker verification. A system 100 practicing this method receives a request to verify a speaker (602) and generates a text challenge that is unique to the request (604). In response to the request, the system 100 prompts the speaker to utter the text challenge (606) and records a dynamic image feature of the speaker as the user utters the text challenge (608). The system 100 can generate the text challenge to elicit one or more highly distinctive behaviors of the speaker. The dynamic image feature can include a pattern of movement of a body part, such as head, lips, mouth, eyes, and eyebrows. The dynamic image feature can relate to phonetic content of the speaker speaking the text challenge, speech prosody, and/or a facial expression of the speaker in response to content of the text challenge. Then the system 100 can perform speaker verification of the user based on the dynamic image feature and the text challenge (610). For example, the system 100 can perform speaker verification based on a database of speaker behaviors, a speaker profile, and/or a location of the speaker.

FIG. 7 illustrates a second example method embodiment for identifying a user. A system 100 practicing this method prompts the user to utter a unique text challenge (702) and records audio and video of the user while the user utters the unique text challenge (704). If the unique text challenge is unpredictable or unguessable, then the system 100 can provide enhanced security and certainty that the user is not an imposter. Then the system 100 performs a comparison of the audio and the video to a database of observable behavior based on the unique text challenge (706) and identifies the user based on the comparison (708). The system can further ensure that the audio and the video match. For example, the system can identify features of the user in the video, analyze the features, and temporally align the features to the audio based on the unique text challenge. The features can include a degree of a mouth opening, symmetry of the mouth opening, lip rounding, lip spreading, visible tongue position, head movement, eyebrow movement, eye shape, and/or a facial expression of the user in response to the unique text challenge.

FIG. 8 illustrates a third example method embodiment confirming an identity of a user as a service accessed via a user verification device. A system 100 practicing this method receives, from a user verification device, a request to confirm a user identity (802) and retrieves a user profile associated with the user identity (804). Then the system 100 generates a unique text challenge based on the user profile (806) and instructs the user verification device to prompt the user to utter the unique text challenge (808). The system 100 receives from the user verification device an audio recording and a video recording of the user uttering the unique text challenge (810) and performs an analysis of the audio recording and the video recording based on the user profile (812). Then the system 100 can send a confirmation to the user verification device if the analysis meets a verification threshold (814). In one variation, the system 100 also receives from the user verification device an indication of desired user verification certainty, and sets the verification threshold based on the desired user verification certainty. The user verification device can use the confirmation as part of a multi-factor authentication of the user in combination with other authentication methods such as password verification.

The user profile can be generated as part of a user enrollment process. For example, the user can voluntarily and actively enroll in the speaker verification system by providing speech samples so that the system can generate the user profile and determine which types of text challenges elicit which types of visual or observable features while the user speaks the text challenge. Alternatively, the system can monitor user speech, mannerisms, video conversations, and/or other inputs that the user does not primarily intend as part of an enrollment process. The system can use this passively gathered information to create, modify, or augment a user profile. Using the user profile, the system can generate unique text challenges designed to elicit a distinctive identifiable behavior in the user as the user utters the unique text challenge.

One user can be associated with multiple user profiles. For example, a bilingual user can have two different user profiles, one for each language. If the text challenge is in the first language, then that user's dynamic image features while uttering the text challenge may be different than when the user utters a text challenge in the second language. Similarly, a user's behaviors, mannerisms, and other observable behavior may differ based on location. For example, a user may be more relaxed at home or at the park than at his or her workplace. The system can account for these differences with separate user profiles or with a location-based profile modifier.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to speaker verification as part of a computing device login in addition to or in conjunction with a traditional login. Those skilled in the art will readily recognize various modifications and changes that may be made to the principles described herein without following the example embodiments and applications illustrated and described herein, and without departing from the spirit and scope of the disclosure.

We claim:

1. A method comprising:
generating, at a level of security, a text challenge, wherein generating the text challenge is based on eliciting distinctive behavior of a user when compared to behavior of other users, the behavior of other users and the highly distinctive behavior of the user being stored in a database of dynamic image features;
prompting the user to utter the text challenge;
recording audio and video of the user as the user utters the text challenge, to yield a recording; and
performing user verification using the recording.

2. The method of claim 1, wherein the generating of the text challenge and the performing of user verification are further based on a user profile.

3. The method of claim 1, wherein the recording of the audio and the video yields a dynamic image feature.

4. The method of claim 3, wherein the dynamic image feature comprises a pattern of movement.

5. The method of claim 4, wherein the pattern of movement is based on one of head, lips, mouth, eyes, and eyebrows.

6. The method of claim 3, wherein the dynamic image feature relates to one of phonetic content of the user speaking the text challenge, speech prosody, a facial expression of the user in response to content of the text challenge, and a non-facial physically manifested response.

7. The method of claim 1, wherein the performing of user verification is further based on a database of user behaviors.

8. The method of claim 1, wherein the performing of user verification is further based on a location of the user.

9. A system comprising:
a processor; and a computer-readable storage medium having instructions stored which, when executed by the processor, result in operations comprising:
generating, a level of security desired, a text challenge, wherein generating the text challenge is based on eliciting distinctive behavior of a user when compared to behavior of other users, the behavior of other users and the highly distinctive behavior of the user being stored in a database of dynamic image features;
prompting the user to utter the text challenge;
recording an audio and a video of the user as the user utters the text challenge, to yield a recording; and
performing user verification using the recording.

10. The system of claim 9, wherein the generating of the text challenge and the performing of user verification are further based on a user profile.

11. The system of claim 9, wherein the recording of the audio and the video yields a dynamic image feature.

12. The system of claim 11, wherein the dynamic image feature comprises a pattern of movement.

13. The system of claim 12, wherein the pattern of movement is based on one of head, lips, mouth, eyes, and eyebrows.

14. The system of claim 11, wherein the dynamic image feature relates to one of phonetic content of the user speaking the text challenge, speech prosody, a facial expression of the user in response to content of the text challenge, and a non-facial physically manifested response.

15. The system of claim 9, wherein the performing of user verification is further based on a database of user behaviors.

16. The system of claim 9, wherein the performing of user verification is further based on a location of the user.

17. A computer-readable storage device having instructions stored which, when executed by a computing device, result in operations comprising:
generating, a level of security desired, a text challenge, wherein generating the text challenge is based on eliciting distinctive behavior of a user when compared to behavior of other users, the behavior of other users and the highly distinctive behavior of the user being stored in a database of dynamic image features;
prompting the user to utter the text challenge;
recording an audio and a video of the user as the user utters the text challenge, to yield a recording; and
performing user verification using the recording.

18. The computer-readable storage device of claim 17, wherein the generating of the text challenge and the performing of user verification are further based on a user profile.

19. The computer-readable storage device of claim 17, wherein the recording of the audio and the video yields a dynamic image feature.

20. The computer-readable storage device of claim 19, wherein the dynamic image feature comprises a pattern of movement.

* * * * *